US010956925B1

(12) United States Patent
Ouyang et al.

(10) Patent No.: US 10,956,925 B1
(45) Date of Patent: Mar. 23, 2021

(54) METHOD AND SYSTEM FOR PERFORMING TRANSACTIONS USING AGGREGATE PAYMENT MEDIA

(71) Applicants: Peter Ouyang, San Diego, CA (US); Ken Yocum, Encinitas, CA (US); Leah Zhao, San Diego, CA (US); Ye Ji Kim, San Diego, CA (US); Crystal Chung, San Diego, CA (US); Andre Luis, San Diego, CA (US); Carol Ann Howe, San Diego, CA (US); Mohammad Daraghmeh, Redmond, WA (US)

(72) Inventors: Peter Ouyang, San Diego, CA (US); Ken Yocum, Encinitas, CA (US); Leah Zhao, San Diego, CA (US); Ye Ji Kim, San Diego, CA (US); Crystal Chung, San Diego, CA (US); Andre Luis, San Diego, CA (US); Carol Ann Howe, San Diego, CA (US); Mohammad Daraghmeh, Redmond, WA (US)

(73) Assignee: Intuit Inc., Mountain View, CA (US)

( * ) Notice: Subject to any disclaimer, the term of this patent is extended or adjusted under 35 U.S.C. 154(b) by 457 days.

(21) Appl. No.: 15/851,577

(22) Filed: Dec. 21, 2017

(51) Int. Cl.
*G06Q 30/00* (2012.01)
*G06Q 30/02* (2012.01)
*G06Q 20/34* (2012.01)
*G06Q 20/22* (2012.01)
*G06Q 20/10* (2012.01)

(52) U.S. Cl.
CPC ....... *G06Q 30/0215* (2013.01); *G06Q 20/227* (2013.01); *G06Q 20/341* (2013.01); *G06Q 20/10* (2013.01)

(58) Field of Classification Search
CPC ................. G06Q 30/014; G06Q 30/0601
See application file for complete search history.

(56) References Cited

U.S. PATENT DOCUMENTS

| | | | |
|---|---|---|---|
| 2010/0217701 A1* | 8/2010 | Mesilaty | G06Q 40/00 705/35 |
| 2013/0228616 A1* | 9/2013 | Bhosle | G06Q 20/227 235/375 |
| 2018/0165690 A1* | 6/2018 | Fordyce, III | G06Q 10/10 |
| 2018/0189769 A1* | 7/2018 | Narasimhan | G06Q 20/4014 |
| 2018/0225697 A1* | 8/2018 | Postrel | G06Q 20/06 |
| 2018/0336562 A1* | 11/2018 | Umanski | G06Q 20/4014 |
| 2019/0164184 A1* | 5/2019 | Walz | H04N 1/32144 |
| 2019/0172045 A1* | 6/2019 | Dunjic | H04L 67/125 |

* cited by examiner

*Primary Examiner* — Alvin L Brown
(74) *Attorney, Agent, or Firm* — Ferguson Braswell Fraser Kubasta PC

(57) ABSTRACT

A method for performing transactions using an aggregate payment medium involves obtaining payee data associated with a payee, obtaining transaction data associated with a transaction to be performed between a payer and the payee, and determining, for each payment medium, a benefit and a cost associated with using the payment medium for the transaction. The method further includes obtaining, for each of the payment media, a return from using the payment medium for the transaction, based on the benefit and the cost, selecting, from the payment media, a payment medium with a highest return, and providing, by the aggregate payment medium, payment medium data associated with the selected payment medium to the payee to enable execution of the transaction.

27 Claims, 10 Drawing Sheets

METHOD AND SYSTEM FOR PERFORMING TRANSACTIONS USING AGGREGATE PAYMENT MEDIA

BACKGROUND

Optimally using payment media such as credit cards is complicated by the myriad of rules that are associated with these payment media. These rules may sharply differ between different payment media, they may be specific to particular transactions and may further change over time. A user, thus, faces a significant challenge when attempting to select an appropriate payment medium for a transaction, in an attempt to minimize the transaction cost while maximizing the transaction benefit.

SUMMARY

In general, in one aspect, one or more embodiments relate to a method for performing transactions using an aggregate payment medium, the method comprising: obtaining payee data associated with a payee; obtaining transaction data associated with a transaction to be performed between a payer and the payee, using the aggregate payment medium; obtaining rules associated with a plurality of payment media that are associated with the aggregate payment medium; determining, for each payment medium of the plurality of payment media, a benefit associated with using the payment medium for the transaction, based on the rules associated with the payment medium; determining, for each payment medium of the plurality of payment media, a cost associated with using the payment medium for the transaction, based on the rules associated with the payment medium; obtaining, for each of the plurality of payment media, a return from using the payment medium for the transaction, based on the benefit and the cost; selecting, from the plurality of payment media, a payment medium with a highest return; and providing, by the aggregate payment medium, payment medium data associated with the selected payment medium to the payee to enable execution of the transaction.

In general, in one aspect, one or more embodiments relate to a non-transitory computer-readable storage medium storing a program, which when executed on a processor, performs instructions comprising obtaining payee data associated with a payee; obtaining transaction data associated with a transaction to be performed between a payer and the payee, using the aggregate payment medium; obtaining rules associated with a plurality of payment media that are associated with the aggregate payment medium; determining, for each payment medium of the plurality of payment media, a benefit associated with using the payment medium for the transaction, based on the rules associated with the payment medium; determining, for each payment medium of the plurality of payment media, a cost associated with using the payment medium for the transaction, based on the rules associated with the payment medium; obtaining, for each of the plurality of payment media, a return from using the payment medium for the transaction, based on the benefit and the cost; selecting, from the plurality of payment media, a payment medium with a highest return; and providing, by the aggregate payment medium, payment medium data associated with the selected payment medium to the payee to enable execution of the transaction.

In general, in one aspect, one or more embodiments relate to an aggregate payment medium comprising: a payment terminal interface configured to interface with a payment terminal; and a system on a chip communicatively connected to the payment terminal interface and configured to: obtain payee data associated with a payee; obtain, via the payment terminal interface, transaction data associated with a transaction to be performed between a payer and the payee, using the aggregate payment medium; obtain rules associated with a plurality of payment media that are associated with the aggregate payment medium; determine, for each payment medium of the plurality of payment media, a benefit associated with using the payment medium for the transaction, based on the rules associated with the payment medium; determine, for each payment medium of the plurality of payment media, a cost associated with using the payment medium for the transaction, based on the rules associated with the payment medium; obtain, for each of the plurality of payment media, a return from using the payment medium for the transaction, based on the benefit and the cost; select, from the plurality of payment media, a payment medium with a highest return; and provide, by the aggregate payment medium, payment medium data associated with the selected payment medium to the payee using the payment terminal interface to enable execution of the transaction.

Other aspects of the invention will be apparent from the following description and the appended claims.

DETAILED DESCRIPTION

Figure 1:
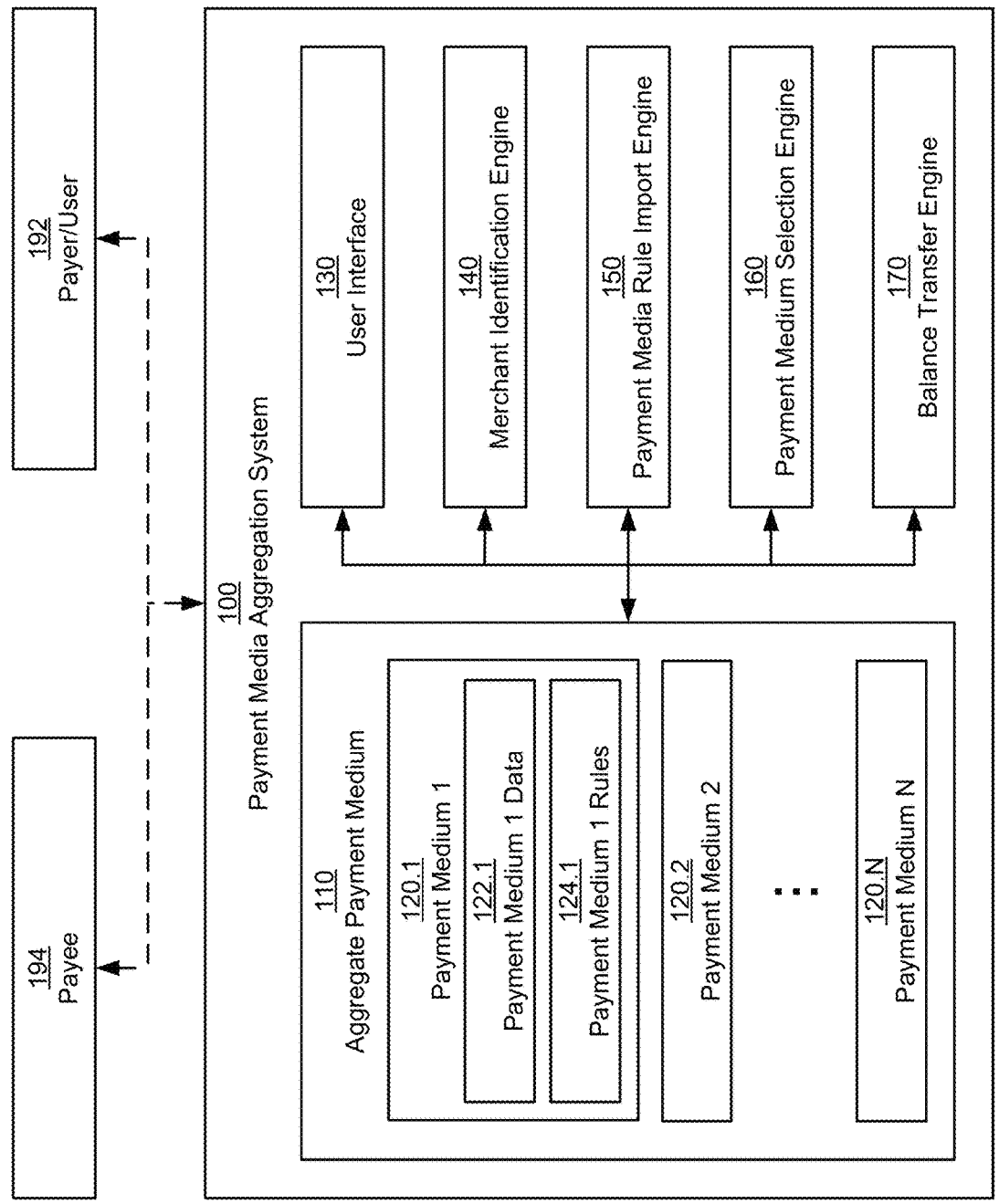
FIG. 1 shows a payment media aggregation system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Further, although the description includes a discussion of various embodiments, the various disclosed embodiments may be combined in virtually any manner. All combinations are contemplated herein.

In general, one or more embodiments provide a method and a system for performing transactions using aggregate payment media. Payment media, such as credit cards, debit cards, checking accounts, loans, etc. may be associated with various rules that result in different transaction costs (or benefits), depending on a variety of factors. Consider, for example, a credit card. The credit card may offer rewards for transactions, whereas interest may be charged for outstanding balances. However, these rewards and interest rates may be governed by the credit card's rules. These rules may differ depending on the credit card that is used, depending on the payment scenario, and they may also change over time. For example, different reward rates may apply depending on the type of purchase that is being made using the credit card. Frequently, limited time offers may result in dramatically different rates and a user may not be aware of these changes. Similarly, promotional offers may be financially highly attractive, yet a credit card user may not even know about them. Interest may be charged for unpaid balances. The interest rates may fluctuate between credit cards, depending on the transaction resulting in the balance and/or over time. Accordingly, making optimal use of multiple credit cards, all with their own unique sets of rules is non-trivial and poses a significant cognitive burden.

Methods and systems for performing transactions using aggregate payment media, in accordance with one or more embodiments of the invention join multiple payment media in a single aggregate payment medium. In one or more embodiments of the invention, when a transaction is performed using the aggregate payment medium, the most suitable payment medium for the transaction, based on information gathered about the payee, the transaction, rules associated with the payment medium, etc., is selected. The most suitable payment medium may be the payment medium that satisfies user-specified criteria such as the minimization of the transaction cost, the maximization of a reward associated with the transaction, a particular type of reward, etc. While the following discussion illustrates methods and systems for performing transactions using aggregate payment media based on scenarios that involve credit cards, those skilled in the art will appreciate that the methods and systems are equally suitable to be used in conjunction with other payment media, including but not limited to, checking accounts, debit cards, home equity lines of credit, and combinations thereof.

FIG. 1 shows a payment media aggregation system in accordance with one or more embodiments of the invention. The payment media aggregation system (100) is used for interactions between a payer (192) and a payee (194). In this scenario, the payer (192) is the user of the payment media aggregation system. In a scenario involving credit card payments, the payer (192) may be a customer purchasing goods and/or services from the payee, e.g., a merchant. The payment media aggregation system (100) may be used to provide payment information that enables the merchant to complete the transaction by charging the customer for the purchased goods and/or services. The payment media aggregation system (100) may provide payment information that is specific to a credit card that the payment media aggregation system has identified from a pool of credit cards known to the payment media aggregation system. The selected credit card, in accordance with one or more embodiments of the invention, was picked by the payment media aggregation system based on a variety of criteria, as subsequently discussed.

The payment media aggregation system (100), in accordance with one or more embodiments of the invention, includes a variety of components, such as an aggregate payment medium (110), a user interface (130), a merchant identification engine (140), a payment media rule import engine (150), a payment medium selection engine (160) and a balance transfer engine (170). Each of these components is subsequently described. An exemplary implementation of the payment media aggregation system (100) is discussed below, with reference to FIG. 2.

The aggregate payment medium (110), in accordance with one or more embodiments of the invention, is a repository that stores information related to the payment media (120.1-120.N). The payment media (120.1-120.N) may be any type of payment media, e.g. credit cards, debit cards, credit lines, combinations thereof, etc. Information for any number of payment media may be stored in the aggregate payment medium. The stored information may include payment medium data (122.1) and payment medium rules (124.1), separately for each payment medium.

The payment medium data (122.1), in accordance with one or more embodiments of the invention, include payment medium information that is necessary to complete a transaction. In the case of a credit card being used as a payment medium, the payment medium data (122.1) may store all information necessary to enable a credit card transaction to be completed. The credit card information may include, for example, the credit card number, the expiration date, the name of the credit card user and/or other data that may be stored on a credit card. Once a particular payment medium (e.g., a credit card) has been selected by the payment medium selection engine (160), the payment medium data of the selected credit card may be provided to payee (194), as further described below.

The payment medium rules (124.1), in accordance with one or more embodiments of the invention, include rules associated with the use of the payment medium (e.g., a credit card). These rules may make the use of the credit card for a particular transaction more or less appealing. Credit card rules may include, but are not limited to:
- global spending limits and spending limits that is specific to particular types of transactions,
- global interest rates and interest rates that are specific to particular types of transactions,
- the model(s) used by the credit card provider to calculate interest payments (e.g., whether a previous balance method, an adjusted balance method and/or an average daily balance method is used)
- types of rewards (e.g., cashback, points, airline miles, etc.),
- global reward rates and reward rates that are specific to particular types of transactions,
- time limits associated with interest rates and rewards,
- special offers, including associated rewards and/or fees.

These rules may differ between credit cards (or payment media, in general) and may also change frequently, thus requiring regular updating.

The aggregate payment medium (110) may be implemented as a repository using any format suitable for the storage of credit card information and/or associated credit card rules. The repository may include, for example, text files, spreadsheets, SQL databases etc. or any other type of hierarchical, relational and/or object oriented collection of data. The repository may be stored in non-volatile or volatile memory, e.g. on a hard disk drive, in flash memory and/or in random access memory. The repository may further be protected from unauthorized access using, e.g., password protection, encryption, etc.

The user interface (130), in accordance with one or more embodiments of the invention, is configured to enable a user (192) to operate the payment media aggregation system (100). The user interface (130) may provide access to control elements for authorizing transactions, setting preferences, importing payment media, etc. The user interface may further provide status information, regarding balances, accumulated rewards, etc. In one embodiment of the invention, the user interface abstracts multiple payment media into a single aggregate payment medium. This aggregate payment medium may be displayed with its associated aggregate awards and a single effective APR. The user interface may be incorporated in, for example, a web application or a mobile application. Exemplary user interfaces are shown in FIGS. 3A-3E.

The merchant identification engine (140), in accordance with one or more embodiments of the invention, is configured to identify the payee (194), e.g., a merchant, involved in the transaction. Various methods for identifying a merchant may be used. In one embodiment of the invention, the merchant is identified using geolocation, e.g., based on global positioning system (GPS) data, the identification of wireless local area networks (W-LAN) in the vicinity, etc. The identification may be performed by software configured to map the geolocation data to known merchants. A merchant may further be identified based on data provided by a payment terminal (not shown) of the merchant. For online purchases, the merchant identification engine (140) may identify a merchant based on the web page being visited, based on a particular app being used, and/or other unique characteristics of the online communication with the merchant's web portal that allow identification of the merchant.

The payment media rule import engine (150), in accordance with one or more embodiments of the invention, is configured to obtain the rules of the payment media (e.g., credit cards) to be used. Once the rules are obtained for a payment medium, they may be stored as payment medium rules (124.1) associated with the payment medium (120.1) under the aggregate payment medium (110). The payment media rule import engine (150) includes a set of machine-readable instructions (stored on a computer-readable medium) which, when executed by the payment media aggregation system (100) obtains payment media rules of those payment media that are included in the aggregate payment medium (110).

Assuming that a credit card rule is used as a payment medium, the credit card rules that are obtained by the payment media rule import engine (150) include, for example, interest rates, reward rates, types of rewards (e.g., cashback vs point, airline miles, etc.), policies that govern interest rates and rewards (e.g., rewards that accrue at different rates (e.g., for groceries vs gas, for specific merchants, etc.), different interest rates that may be time-limited, that may be updated by the credit card provider, that may have certain caps, special offers, etc. Some of these credit card rules may be credit card-specific and do not depend on the credit card holder, e.g., the user (192). The payment media rule import engine may obtain these credit card rules from accessible credit card profiles, e.g., credit card comparison web pages, e.g., by parsing these web pages. Other credit card rules are user-dependent. For example, interest rates and/or credit limits may depend on the credit card holder's credit score, special offers may depend on the credit card holder's purchasing behavior, etc. The payment media rule import engine may obtain these characteristics from credit card holder-specific credit card agreements. These agreements may be accessible online, if credit card account information is provided to the payment media rule import engine (150). Further, a printed copy of the credit card terms and conditions may be scanned, and the credit card's rules may be extracted after performing an optical character recognition and parsing the content. Alternatively, some or all of the credit card rules may be manually provided, by entering these rules via the user interface (130).

The payment medium selection engine (160), in accordance with one or more embodiments of the invention, is configured to identify, based on various criteria, the payment medium to be used in a transaction. The payment medium selection engine (150) includes a set of machine-readable instructions (stored on a computer-readable medium) which, when executed by the payment aggregation system (100), implement one or more of the steps described in the flowcharts of FIGS. 4-6.

The balance transfer engine (170), in accordance with one or more embodiments of the invention, is configured to perform or suggest a balance transfer from an existing account associated with a payment medium (120.1-120.N) to another existing account or to an account to be opened. The balance transfer engine (170) includes a set of machine-readable instructions (stored on a computer-readable medium) which, when executed by the payment media aggregation system (100), implement one or more of the steps described in the flowchart of FIG. 7.

Figure 2A:
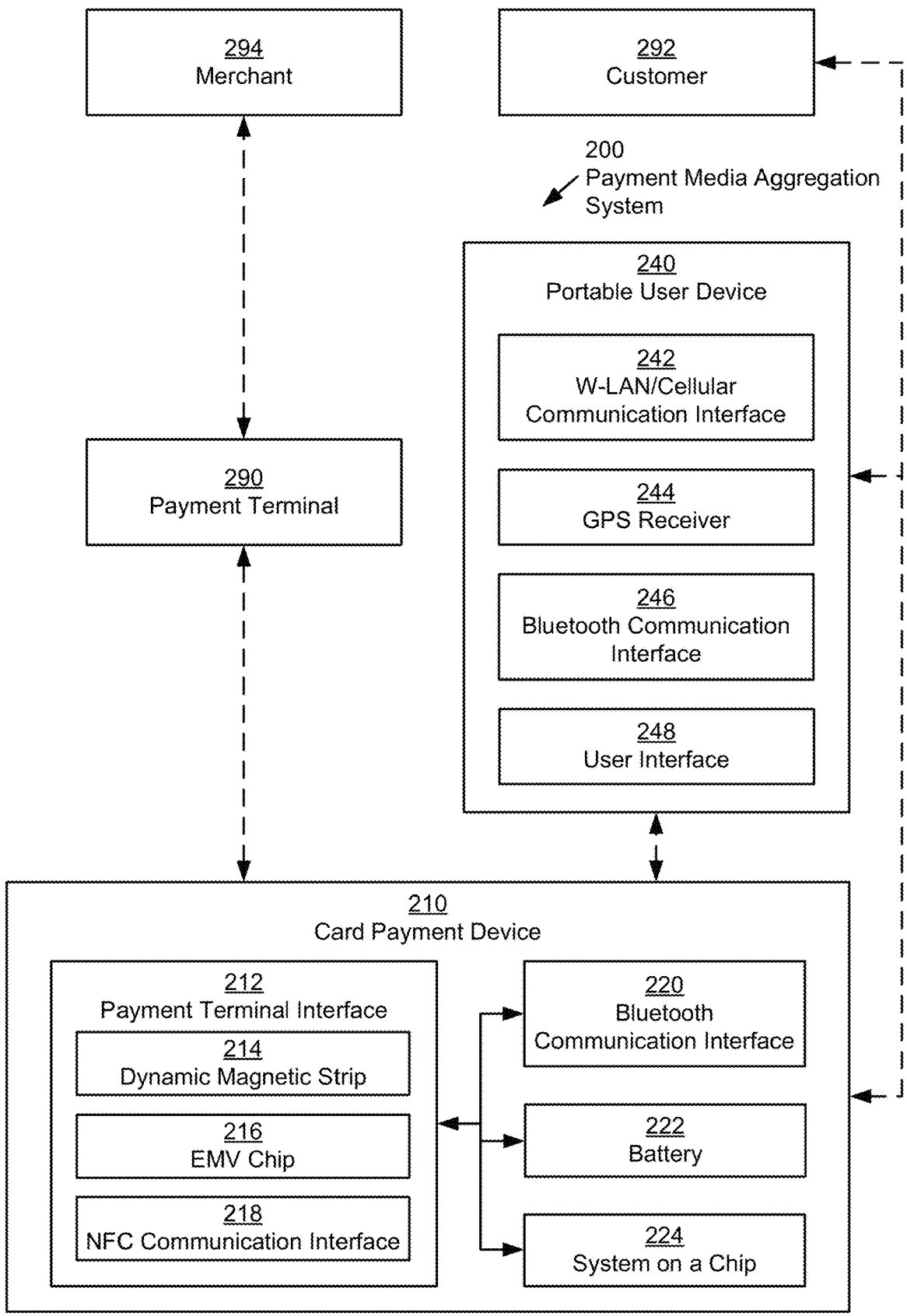
FIGS. 2A and 2B show exemplary implementations of a system in accordance with one or more embodiments of the invention.
Figure 2B:
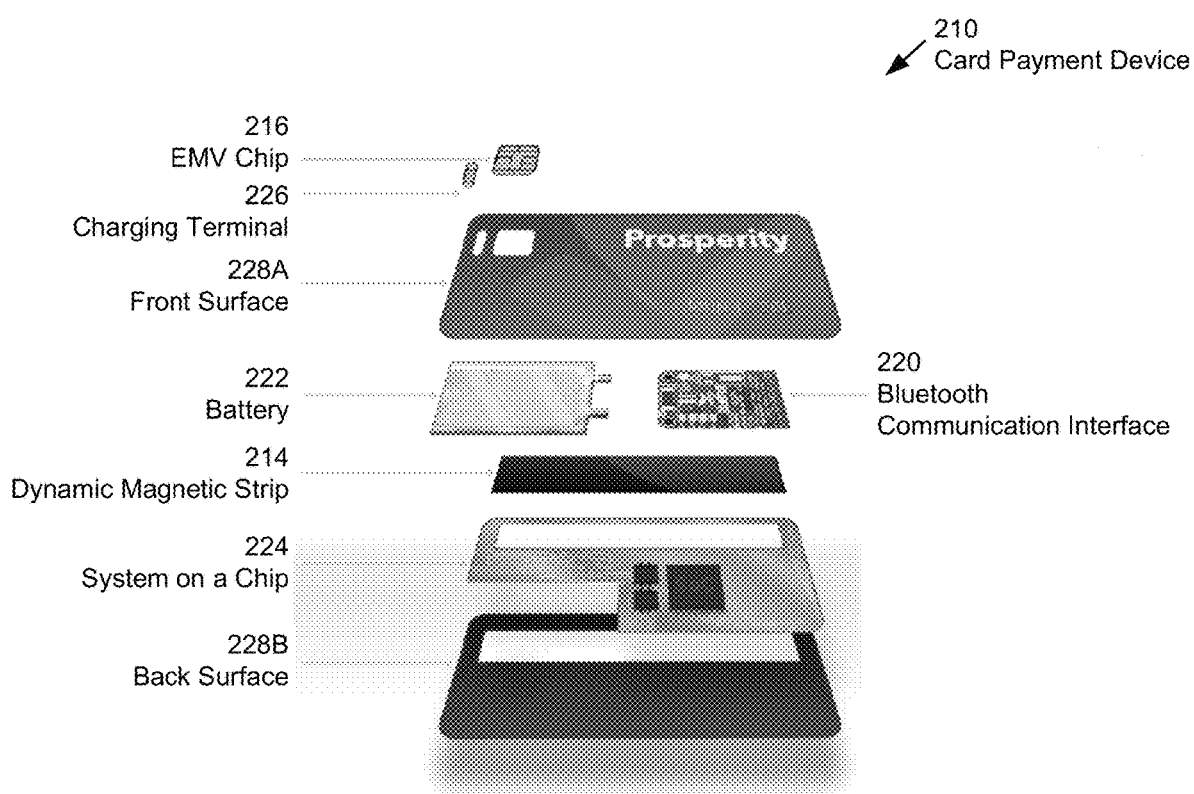

Turning to FIGS. 2A and 2B, exemplary implementations of payment media aggregation systems, in accordance with one or more embodiments of the invention, are shown. In FIG. 2A, the payment media aggregation system (200) includes a card payment device (210) and a portable user device (240). The card payment device, in accordance with an embodiment of the invention, is a credit card-shaped component configured to interface with the payment terminal (290) of the merchant (294), when a customer (292) decides to perform a transaction. Additional details related to the card payment device (210) are subsequently provided. The portable user device (240) is configured to interface with the card payment device (210). The portable user device (240) may be, for example, a smartphone or a tablet computer. Interactions between the portable user device (240) and the card payment device (210) are subsequently described.

In one or more embodiments of the invention, the card payment device (210) includes a payment terminal interface (212). The payment terminal interface may be provided as a physical interface that mimics a credit card. This physical interface may have the mechanical dimensions of a credit card and may include a magnetic strip interface and/or a Europay MasterCard Visa (EMV) chip interface. In contrast to credit cards, however, the payment terminal interface (212) is not limited to providing information that is unique to a particular credit card. Rather, the payment terminal interface (212), in accordance with one or more embodiments of the invention, presents credit card data associated with any credit card that is available to the payment media aggregation system (200). These credit card data may be obtained from the aggregate payment medium (110). Accordingly, the payment terminal interface (212) is programmable to present credit card data of any credit card that is selected as the payment medium, via the dynamic magnetic strip (214) and/or via the EMV chip (216). Alternatively, the payment terminal interface (212) may use a near-field communication (NFC) interface (218) to communicate credit card data. In this case, the payment terminal interface (212) may be integrated into another device that is not necessarily similar to a credit card, e.g., a portable device such as a smartphone.

Those skilled in the art will appreciate that embodiments of the invention that include a payment terminal interface (212) are particularly suitable for in-store purchases that rely on payment terminals (290). One or more embodiments of the invention are suitable for transactions that do not involve the use of payment terminals, for example online transactions. For such transactions, the system does not require the payment terminal interface (212). Instead, the credit card information of the selected credit card may be presented on a display, or alternatively, the appropriate credit card data may be automatically inserted in the appropriate fields of a checkout page of an online purchasing portal, e.g., by a browser extension or a mobile device app configured to handle online payments.

The card payment device (210), in accordance with one or more embodiments of the invention, further includes a Bluetooth communication interface (220) configured to enable communications with the portable user device (240). The Bluetooth communication interface may be based on the energy-efficient Bluetooth Low Energy standard. Alternatively, any other communication interface such as an energy-efficient Internet of Things (IOT) communication interface may be relied upon.

One or more embodiments of the invention include a system on a chip (SOC) (224). The system on a chip may be configured to provide the selected credit card data to the payment terminal interface (212). Depending on the configuration of the payment media aggregation system (200), the SOC may be configured to perform the selection of the credit card to be used for the transaction. In such a scenario in which the card payment device is capable of operating autonomously, without a connection to the portable user device (240), the previously described payment medium selection engine (160), and the aggregate payment medium (110) are implemented on the SOC (224). Alternatively, the selection of the credit card to be used may be performed elsewhere (e.g. on the portable user device (240)). In this scenario, the portable user device (240), via the Bluetooth communication interface (220), provides the credit card data to the SOC (224), which then uses the payment terminal interface (212) to communicate the credit card data to the payment terminal (290).

The SOC may be an integrated circuit (IC) that integrates various components of a local computing device into a single chip. The SOC may include one or more processor cores, associated memory (e.g., random access memory (RAM), cache memory, flash memory, etc.), and interfaces to storage devices, input and output devices, etc. Those skilled in the art will appreciate that the invention is not limited to the aforementioned configuration of the SOC (224).

In one or more embodiments of the invention, the card payment device further includes a battery (222). The battery may be a non-rechargeable battery or a rechargeable battery, configured to power the components of the card payment device (210).

In one or more embodiments of the invention, the portable user device (240) enables the configuration of the payment media aggregation system (200) via the user interface (248). The portable user device (240) may further be relied upon to select a credit card to be used in a transaction. More specifically, the portable user device (240) may use various data gathered in conjunction with a pending transaction to select a credit card to be used for completing the transaction. For example, the portable user device (240) may use its GPS receiver (244) in order to identify the merchant (294). The identification may be performed locally on the portable user device (240) or remotely by a merchant identification service. Such a service may be reached using the W-LAN and/or cellular communication interface (242) of the portable user device. Similarly, the portable user device may gather credit card rules using the W-LAN and/or cellular communication interface (242). The gathered information may be provided to the merchant identification engine (140) which may execute on the portable device (240) or on the card payment device (210). The portable device (240) may include a Bluetooth communication interface (246) that enables the portable device to communicate with the card payment device (210), as needed to complete a transaction.

In one or more embodiments of the invention, the payment media aggregation system (200) further includes a backend (not shown). The backend may be configured to host the payment media rule import engine (150) to collect credit card data and/or the payment medium selection engine (160) to perform the selection of a credit card for a particular transaction, which may then be communicated to the card payment device (210) via the portable user device (240). Those skilled in the art will appreciate that various functionalities of the system (200) may be implemented anywhere on the card payment device (210), the portable user device (240) and/or the backend (not shown).

Turning to FIG. 2B, details of an exemplary card payment device (210) are shown. In addition to the previously described the dynamic magnetic strip (214), the EMV chip (216), the battery (222), and the system on a chip (224), a housing including a front surface (228A) and a back surface (228B) of the card payment device (210) are shown. The exemplary card payment device (210) further includes a charging terminal (226) enabling the recharging of the battery (222).

While FIGS. 2A and 2B show exemplary configurations of payment media aggregation systems (200), other configurations of such system may exist. For example, an NFC-based system may not require the card payment device (210) and may, instead, rely on the NFC communication interface of the portable user device. Further, implementations that are used to perform online transactions may require neither the card payment device (210) nor the portable user device (240). Such implementations may include software that may execute on any computing device that is being used to perform an online transaction, e.g., a desktop computer or a portable computing device such as a tablet computer or a smartphone. The payment media aggregation system, in these scenarios, may be software executing on the computing device and/or elsewhere, e.g., on a backend that may be hosted on a physical or virtual computing device, e.g. in a cloud environment.

FIGS. 3A, 3B, 3C, 3D, and 3E show exemplary user interfaces of a payment media aggregation system, in accordance with one or more embodiments of the invention. Various screenshots of desktop and/or mobile implementations illustrate possible arrangements of informative content and control elements.

Figure 3A:
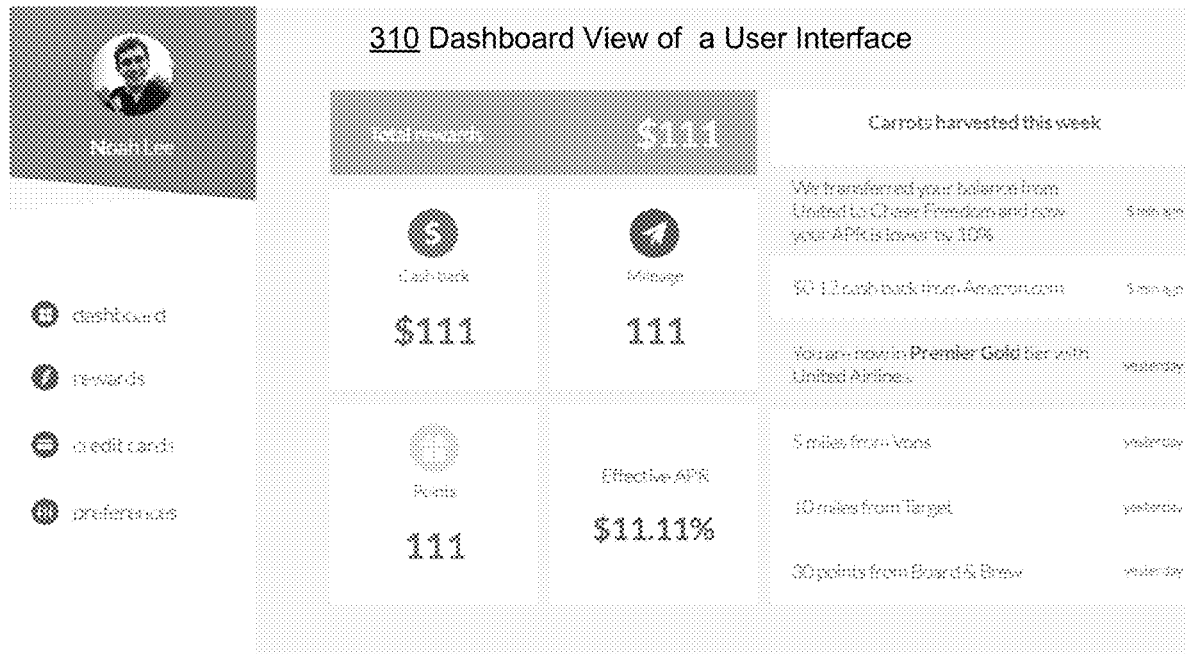
FIGS. 3A, 3B, 3C, 3D, and 3E show exemplary user interfaces of a system in accordance with one or more embodiments of the invention.

FIG. 3A shows a dashboard view (310) of a user interface, in accordance with one or more embodiments of the invention. The exemplary dashboard view (310) includes a financial summary for the aggregate payment medium, i.e., for all payment media that are registered with the payment media aggregation system. The financial summary includes rewards and an effective interest rate. The exemplary dashboard view (310) further includes an event history, showing earnings of rewards, the initiation of balance transfers, etc.

Figure 3B:
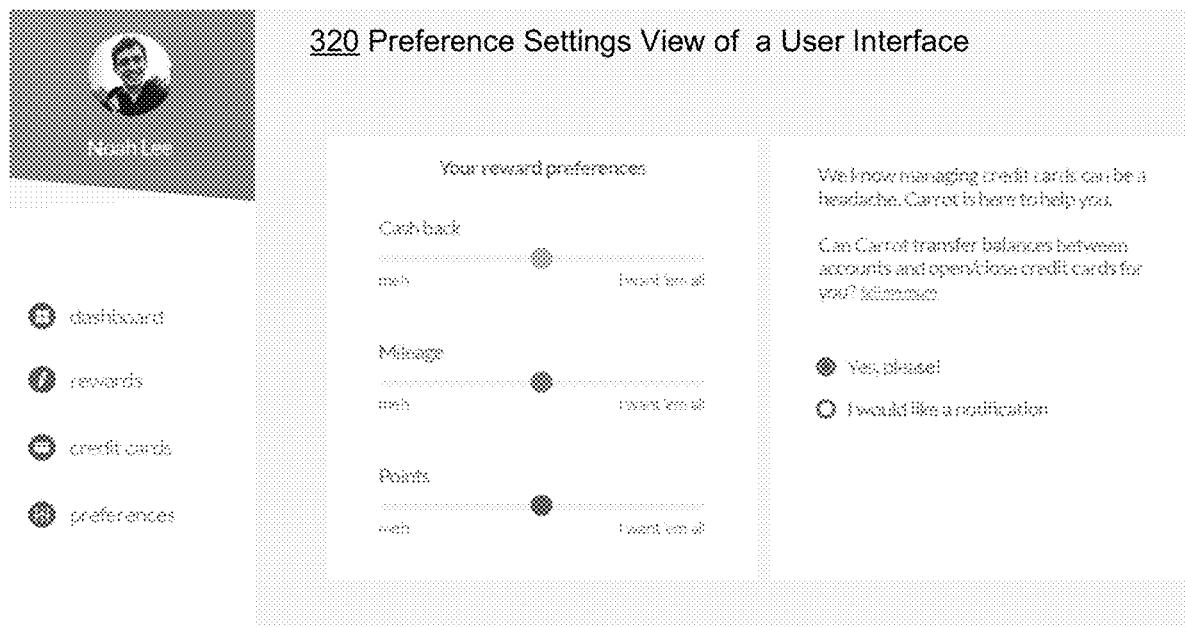

FIG. 3B shows a preference settings view (320) of the user interface, in accordance with one or more embodiments of the invention. The preference settings view (320) includes sliders that enable a user to adjust reward preferences for different categories such as cashback, miles and points. These reward preferences may be used to adjust weighting factors when determining the value of rewards, as further described below with reference to FIGS. 4-6. The exemplary preference settings view (320) further enables the user to choose whether balance transfers between payment media may be automatically initiated, or whether the availability of a beneficial balance transfer merely triggers a user notification. A detailed description of methods for performing balance transfers is provided below with reference to FIG. 7.

Figure 3C:
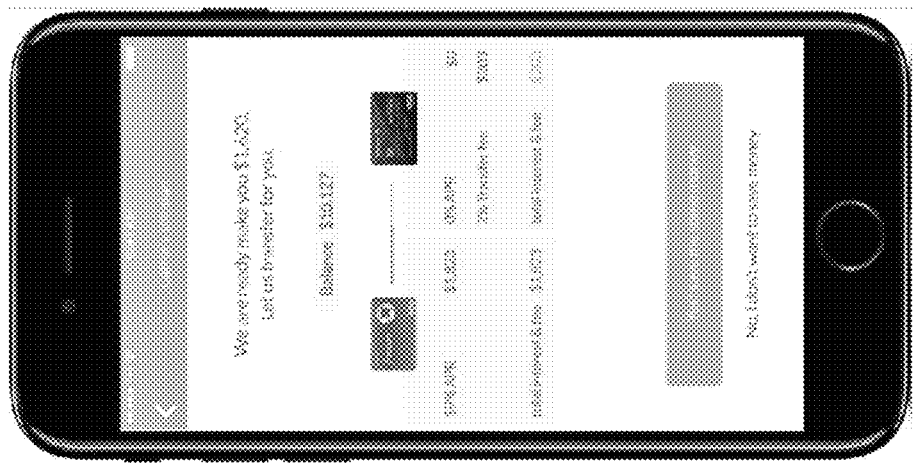

FIG. 3C shows a reward summary view (330) of the user interface, in accordance with one or more embodiments of the invention. The reward summary view (330) shows the available rewards for the aggregate payment medium. In other words, the obtained and/or available rewards for all registered payment media may be shown. Methods for determining the rewards for the aggregate payment medium are described below.

Figure 3D:
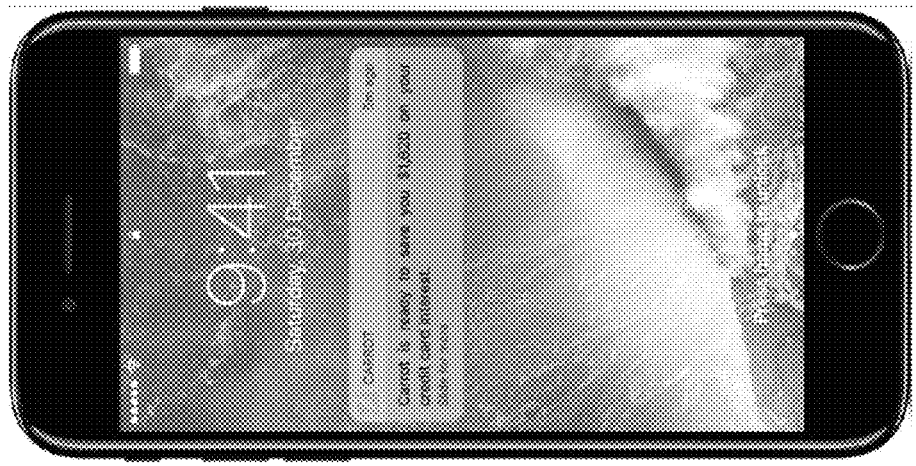

FIG. 3D shows a notification view (340) of the user interface, in accordance with one or more embodiments of the invention. The exemplary notification view (340) indicates to the user that a balance transfer with the potential to save $1,260 is available. The user may respond to the notification by reviewing the details of the balance transfer, as shown in FIG. 3E.

Figure 3E:
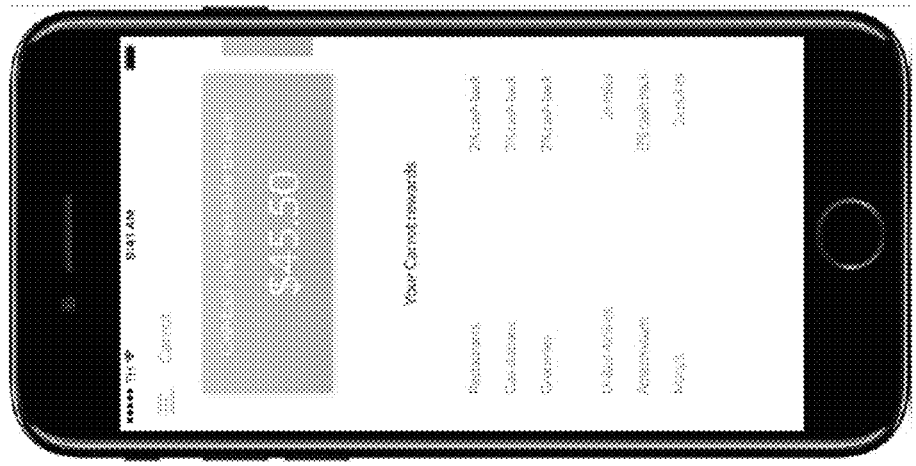

FIG. 3E shows a balance transfer dialog view (350) of the user interface, in accordance with one or more embodiments of the invention. The exemplary balance transfer dialog view (350) shows the cost and the benefit of the balance transfer, resulting in savings to the user. Based on this information the user may choose to perform or reject the balance transfer.

FIGS. 4-7 show flowcharts in accordance with one or more embodiments of the invention. While the various steps in these flowcharts are provided and described sequentially, one of ordinary skill will appreciate that some or all of the steps may be executed in different orders, may be combined or omitted, and some or all of the steps may be executed in parallel. Furthermore, the steps may be performed actively or passively. For example, some steps may be performed using polling or be interrupt driven in accordance with one or more embodiments of the invention. By way of an example, determination steps may not require a processor to process an instruction unless an interrupt is received to signify that condition exists in accordance with one or more embodiments of the invention. As another example, determination steps may be performed by performing a test, such as checking a data value to test whether the value is consistent with the tested condition in accordance with one or more embodiments of the invention.

Figure 4:
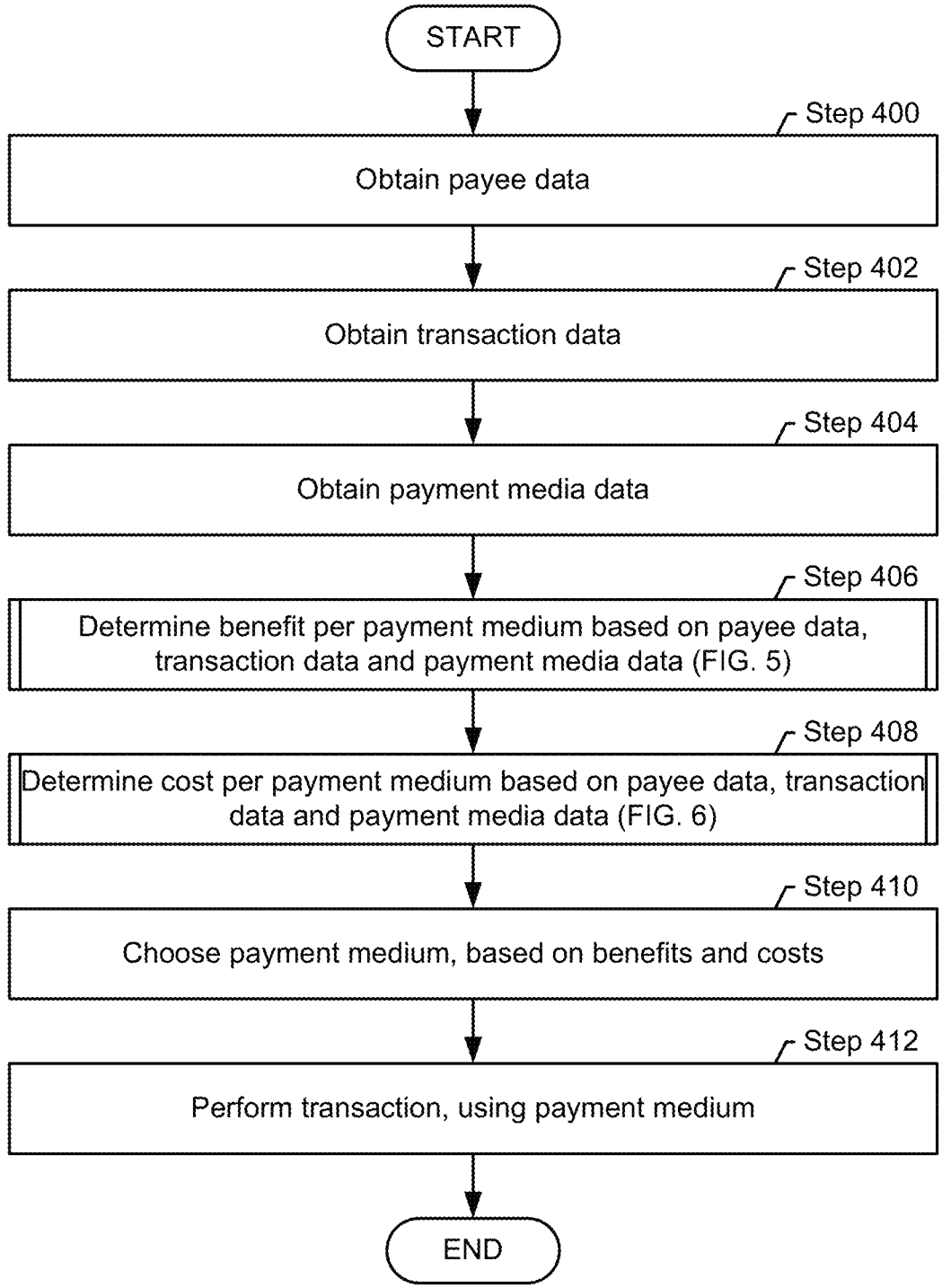
FIGS. 4, 5, 6, and 7 show flowcharts in accordance with one or more embodiments of the invention.

Turning to FIG. 4, a method for performing transactions using aggregate payment media, in accordance with one or more embodiments of the invention, is shown. The method may be used when performing a transaction involving a payment terminal, e.g. in a store, but also when performing an online transaction that does not involve a payment terminal.

In Step 400, payee data are obtained. The payee data may identify the payee as a merchant, e.g., in case of the transaction being performed in a store. Different categories of merchants may be identified. Such categories may include, for example, "gas", "groceries", etc. Alternatively, the payee may be an online shopping portal or any other entity that accepts at least one of the payment media that form the aggregate payment medium. The payee may be determined using a store locator application as previously described. The store locator application may be, for example, GPS-based or alternatively the payee may be identified based on information provided by the payment terminal. In online transactions, the payee data may be obtained based on the web site that is being visited.

In Step 402, transaction data are obtained. The transaction data may include a transaction amount and/or a description of the transaction, e.g., an identifier for the goods or services being purchased. If the transaction involves a payment terminal, the transaction data may be obtained from the payment terminal. If the transaction is performed on a web page, the web page may provide the transaction data.

In Step 404, payment media data are obtained. Payment media data, in accordance with one or more embodiments of the invention, describe the payment media that are available for the transaction to be performed. Payment media data may include information that can be used to determine costs and/or benefits associated with completing the transaction using the payment media. This information may be represented by rules associated with the payment media. Payment media data may further include information that can be used to determine whether a particular payment medium is suitable for completing the transaction. For example, the payment media data may include credit card limits and credit card balances. If the available balance of a particular credit card is below the transaction cost, the credit card may not qualify as a payment medium to be used in the transaction. Payment media data may be obtained from the aggregate payment medium forming a repository.

In Step 406, the benefit of using a particular payment medium is determined, based on the payee data, the transaction data and the payment media data, for each available payment medium. A detailed description of Step 406 is provided in FIG. 5.

In Step 408, the cost of using a particular payment medium is determined, based on the payee data, the transaction data and the payment media data, for each available payment medium. A detailed description of Step 408 is provided in FIG. 6.

In Step 410, a payment medium is selected based on the benefits and costs determined in Steps 406 and 408, respectively. For each payment medium under consideration, the return resulting from using the payment medium may be assessed based on the difference between the benefit and the cost of using the payment medium for the transaction. The payment medium with the highest associated value may be chosen. Alternatively, an ordered list of payment media may be provided to the user, based on the returns associated with the payment media, enabling the user to make an informed decision regarding the payment medium to be used for the transaction.

In Step 412, the transaction is performed, using the payment medium selected in Step 410. In credit card scenarios, the transaction may be performed by authorizing the transaction via the payment terminal. During the authorization, the credit card data of the credit card that was found to have the highest return is provided. In online purchasing scenarios, the payment page may be populated with the credit card data, e.g. by a browser extension or a mobile device app. Alternatively, to perform other types of transactions, the payment medium data may be displayed to the user of the system for optimized selection of payment media. The user may then manually complete the transaction using the payment medium.

Figure 5:
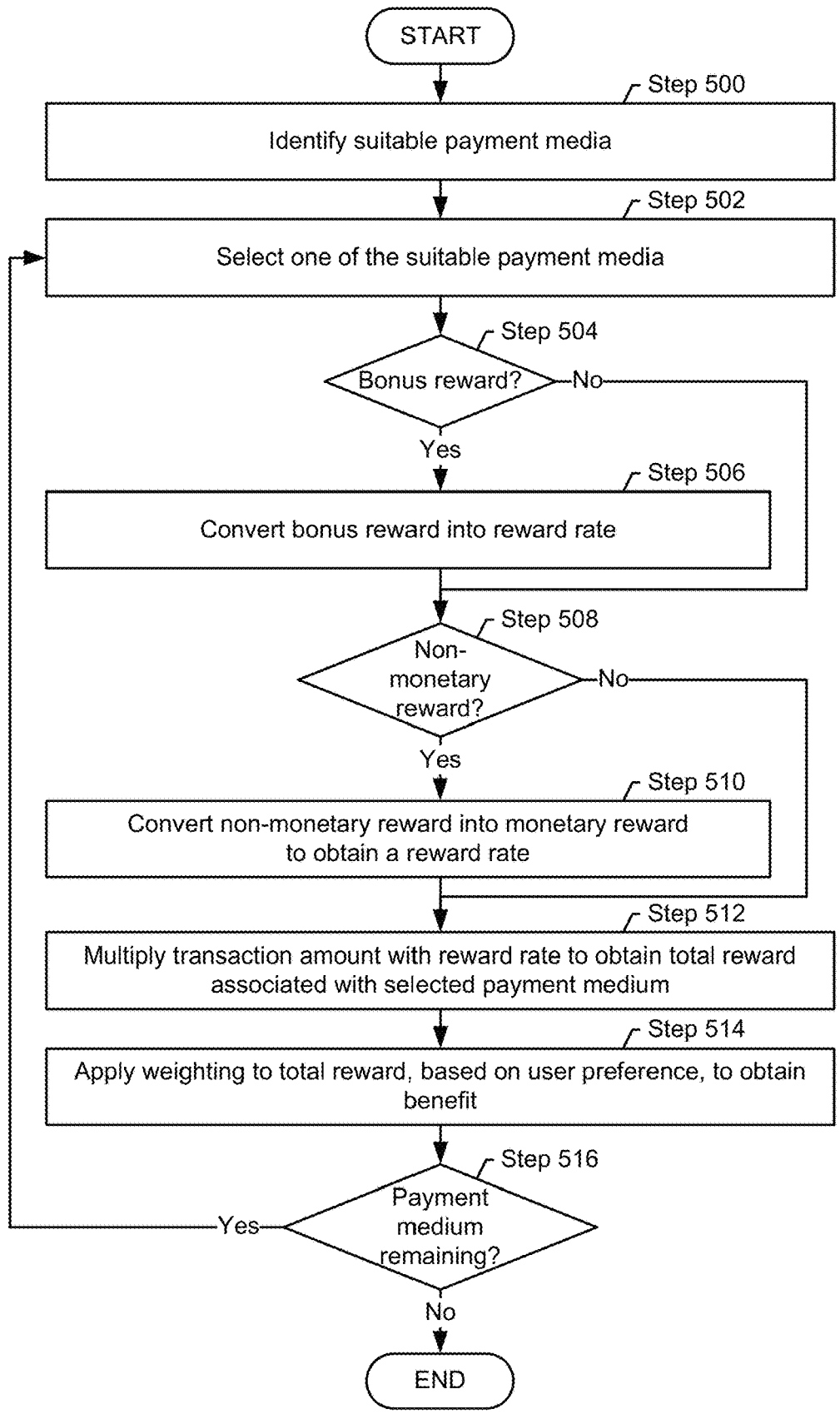

Turning to FIG. 5, a method for determining the benefit of using a particular payment medium is determined, based on the payee data, the transaction data and the payment medium data, for each available payment medium.

In Step 500, payment media that are suitable for the transaction are selected. All payment media that are registered with the aggregate payment medium may initially be considered. However, certain payment media may be eliminated. For example, if the available balance of a payment medium is known, and this available balance is below the transaction amount, the payment medium may be eliminated from the list of suitable payment media. Similarly, not all payment media may be accepted by the payee. For example, the payee may only accept credit cards belonging to a particular credit card network. Only these credit cards would be considered suitable.

In Step 502, a payment medium is selected from the suitable payment media.

In Step 504, a determination is made about whether the rules associated with the selected payment medium indicate the availability of a bonus reward. A bonus reward may be, for example, a sign-on bonus. If a determination is made that a bonus reward is available, the method may proceed to Step 506. If no bonus reward is available, the method may bypass Step 506.

In Step 506, the bonus reward is converted into a reward rate. Consider, for example, a sign-on bonus reward such as $150 cashback for $1,000 spent within the first three months after opening an account. Such a bonus reward would be converted into an effective 15% reward rate.

In Step 508, a determination is made about whether the rules associated with the selected payment medium indicate the availability of a non-monetary reward. A non-monetary reward may be, for example, airline miles or free insurance for rental cars. If a determination is made that a non-monetary reward is available, the method may proceed to Step 510. If no non-monetary reward is available, the method may bypass Step 510.

In Step 510, the non-monetary reward is converted into a monetary reward, enabling the determination of a reward rate. Consider, for example, airline miles that are provided proportional to a transaction amount. An estimated conversion rate (e.g., based on an expected market value) may enable the direct conversion of airline miles into a monetary reward rate.

In Step 512, a total reward is obtained by multiplying the transaction amount with the reward rate. If multiple rewards are available, these rewards may be summed. Further, reward limits may be considered by this operation. For example, if a reward is only available up to a transaction amount of $1,000, whereas the transaction amount is $1,200, the total reward is calculated by applying the reward rate up to the amount of $1,000 only.

In Step 514, a weight is applied to the total reward obtained in Step 512. The weight may be applied to consider the user's preference. For example, a weight ranging from "zero" to "one" may be applied by multiplying the total reward with the weight. If the user has previously indicated, for example, that airline miles are considered an undesirable reward, a weight of "zero" may be applied.

In Step 516, a determination is made about whether an additional suitable payment medium was identified in Step 500. If an additional payment medium was identified, the method may return to Step 502. Otherwise, the execution of the method may terminate. Accordingly, after execution of the method of FIG. 5 for all suitable payment media, a total reward, weighted by the desirability of the reward is available for each of the suitable payment media.

Figure 6:
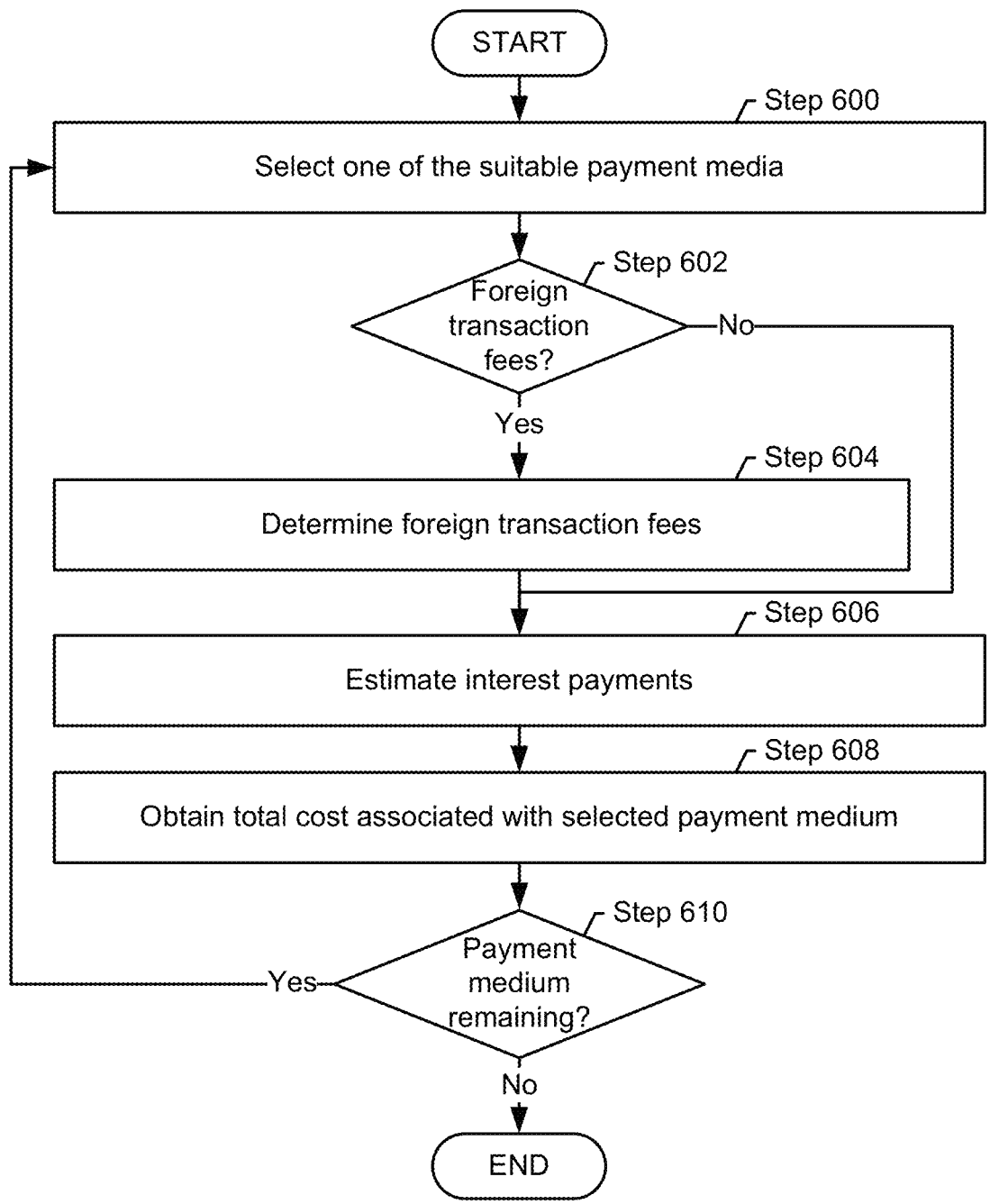

Turning to FIG. 6, a method for determining the cost associated with using a particular payment medium is determined, based on the payee data, the transaction data and the payment medium data, for each payment medium that was previously found to be suitable for the transaction.

In Step 600, a payment medium is selected from the suitable payment media.

In Step 602, a determination is made about whether a foreign transaction fee would result from using the selected payment medium for the transaction. The determination may be made based on the location of the payee, previously identified in Step 400 and based on the credit card rules. If a determination is made that a foreign transaction fee would be triggered, the method may proceed to Step 604 to determine the foreign transaction fee. If no foreign transaction fee would be triggered, the method may bypass Step 604.

In Step 604, the foreign transaction fee that would result from the transaction is determined. The foreign transaction fee may be a fixed fee, a percentage, or a combination of both.

In Step 606, interest payments are estimated. An interest payment is assumed to result from an interest rate applied to a balance that is not paid off at the end of a billing cycle. The interest rate may be obtained from the credit card rules. Variations of interest rates, such as transaction-specific interest rates, may be considered. The balance on which interest is to be paid may be estimated using methods that are subsequently described.

The computation of a potential balance resulting in interest payments may be based on a machine-learned statistical model that estimates the probability that the user will be able to pay the debt incurred by the transaction. Models of varying complexity may be relied upon.

One model may estimate the user's ability to repay the resulting balance by inspection of the user's monthly cash flow obtained from linked bank account data. An assumption may be, for example that the transaction will be fully paid by the user if the user's total credit card balance (including balances on all credit cards of the aggregate payment medium), after the transaction, is less than a three-month running average of the user's bank account balance. Any balance exceeding this amount may be assumed to result in interest payments.

An alternative model may rely on historical account data used to identify statistical functions that describe the probability of a certain debt resulting in interest payments (e.g., because the debt is not immediately and fully paid). Such models may consider the debt amount, the average account balance, the user's history of credit card payments (e.g., whether credit card bills were historically paid in full or not), the user's age, a user's credit score, and/or other factors. Machine learning may be used to identify the statistical function(s). The function(s) may be modeled by a feedforward artificial neural network that may be trained based on stochastic gradient descent methods using backpropagation, thus minimizing a discrepancy between the historical training data and the model's predictions. Specifically, for example, sigmoidal neurons may be used to model the probability of the user repaying a debt. The probability of repayment for a marginal debt (i.e., for the next dollar of debt incurred) may be assumed to have one or more of the following properties: i) The probability of repayment is 1.0 or near 1.0 for small amounts of debt, when the user is likely to repay; ii) The probability of repayment goes to 0.0 for large amounts of debt; iii) The function that models the probability of repayment smoothly interpolates between 0.0 and 1.0; and 4).

The function that models the probability of repayment is capable of modelling different distributions. A suitable model for the above properties, in accordance with an embodiment of the invention, is a sigmoid function. The parameters of the sigmoid function may be functions of user features. Historical data that may include amounts of debt and whether they were repaid by the end of the current billing cycle may be used as labels for training the neural network that includes the sigmoid function(s). The artificial neural network may include one or more layers of neurons that take in user data features and then provide input to the above-described sigmoidal neuron(s). Those skilled in the art will appreciate that various functions may be used to predict a probability of a transaction amount triggering interest payments, without departing from the invention. Using the predicted probability or the transaction triggering interest payments, the interest payment for a time interval may then be estimated based on the product of the predicted probability, an interest rate for the time interval and the transaction amount or balance. Because credit card providers may use different models for determining interest payments, the above calculation may be modified to match the credit card provider's model for determining interest payments. Depending on the model being used, different information such as, for example, the number of days or the number of months until the balance or transaction is paid off, may be considered.

In Step 608, a total cost associated with using the payment medium for the transaction is determined. The total cost may be the sum of all previously determined transaction costs.

In Step 610, a determination is made about whether an additional suitable payment medium is available. If an additional suitable payment medium is available, the method may return to Step 600. Otherwise the execution of the method may terminate. Accordingly, after execution of the method of FIG. 6 for all suitable payment media, a total cost associated with completing the transaction, is available for each of the suitable payment media.

Figure 7:
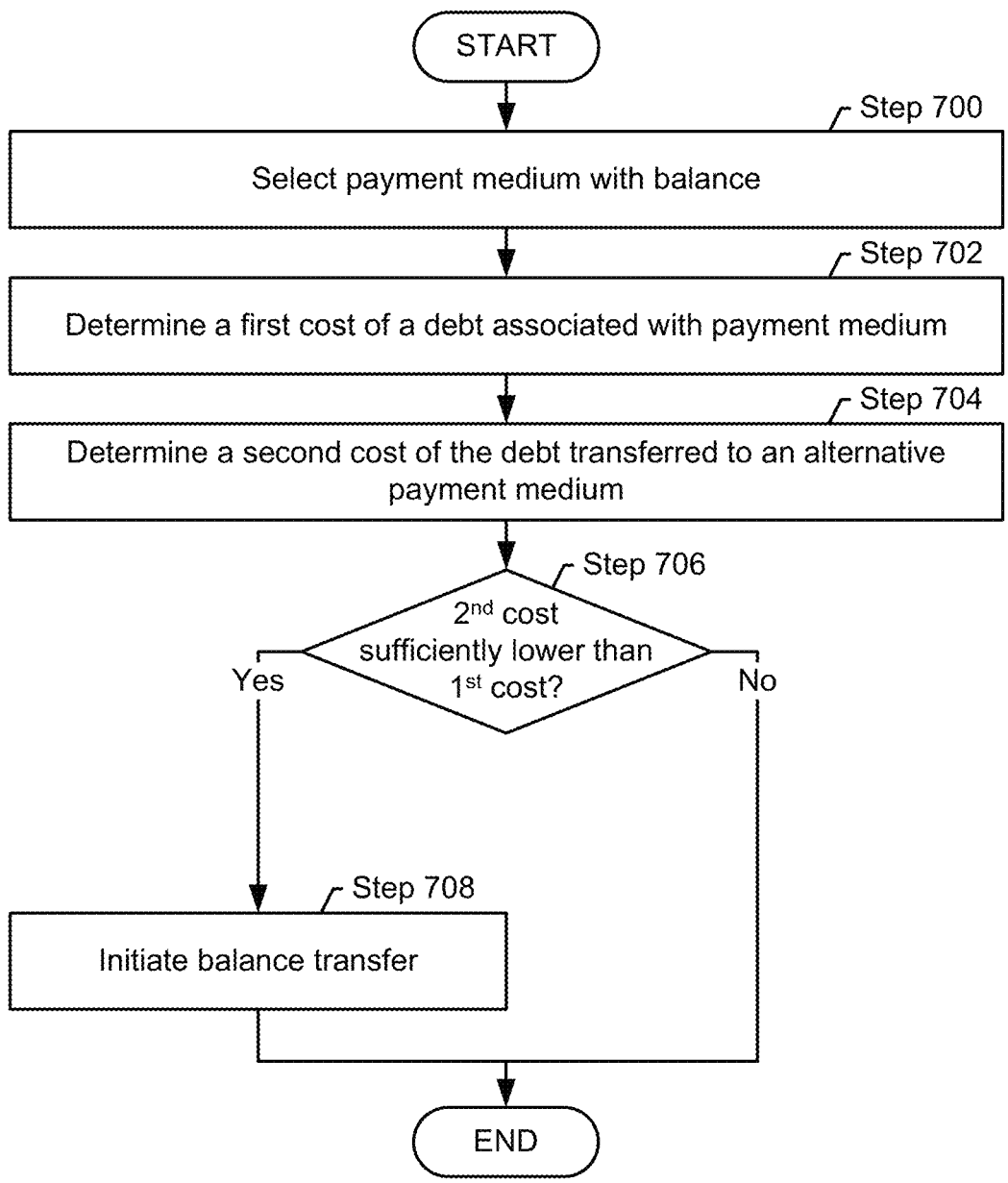

Turning to FIG. 7, a method for performing balance transfers, in accordance with one or more embodiments of the invention, is shown. A balance transfer may be performed to lower the cost of a debt associated with a payment medium, by transferring the debt or part of the debt to another payment medium.

In Step 700, a payment medium with a balance is selected. The balance may be a result of a previously performed transaction (as described with reference to FIGS. 4-6) that exceeded the user's initial ability to repay the full transaction amount, thus triggering interest payments. While, based on the previously described methods, transactions may have been performed using a payment medium with favorable conditions, e.g., comparatively low interest rates on the resulting balance, balance transfers may further lower interest payments.

In Step 702, a cost of a debt associated with the selected payment medium is determined. The cost may be determined based on the balance and the interest rate that is charged for the balance. Multiple different costs may result from multiple balances associated with different interest rates. These costs may, thus, be separately determined.

In Step 704, a cost of the debt when transferred to an alternative payment medium (i.e., after a balance transfer) is determined. The alternative payment medium may be a payment medium that is already included in the aggregate payment medium, or alternatively it may be a newly added payment medium, e.g., a payment medium for which a balance transfer offer is advertised. The cost of the debt, determined in Step 704, further includes non-interest cost, such as balance transfer fees.

In Step 706, a determination is made about whether the cost of the transferred debt would be lower than the original cost of the debt. The determination may consider constraints associated with the transfer, as specified by the credit card rules. For example, in scenarios in which different interest rates are charged for different balances, a balance transfer may first eliminate the balance with the lower interest rate, while balances of higher interest rates may remain, unless the balance transfer is sufficiently high to cover the entire balance. The determination may further consider a user's stated preference to maintain debt and/or a user's history of maintaining credit card debt. Statistical models may be used to predict the repayment probability, enabling computing the relative cost of keeping the debt in the current credit card account versus transferring the debt to the alternative credit card account or other loan vehicle (such as a line of credit.). Because the cost of the debt over time may be influenced by how soon the debt is repaid, a debt repayment model may be used.

If a determination is made that the cost after the balance transfer is sufficiently lower than the cost before the balance transfer, the method may proceed to Step 708. The cost may be considered sufficiently lower if the resulting savings exceed a previously specified amount (either set by business rules or defined by the user). If the previously specified amount is not reached, the execution of the method may terminate.

In Step 708, the balance transfer is initiated. The balance transfer may be automatically completed. Alternatively, initiating the balance transfer may include notifying the user of the balance transfer opportunity. Initiating the balance transfer may further include offering the execution of the balance transfer for the user. Such a balance transfer may be performed between payment media that are already included in the aggregate payment medium, or the balance transfer may require the addition of a new payment medium, e.g. by opening a new credit card account. Assistance may be provided to the user when adding a new payment medium, e.g., by auto-completing fields of the corresponding credit card application.

Various embodiments of the invention have one or more of the following advantages. Embodiments of the invention enable a smart wallet that accommodates multiple payment media in a single aggregate payment medium. When performing a transaction, a user needs to interact with the aggregate payment medium only, while being able to take full advantage of all payment media that are associated with the aggregate payment medium, in accordance with one or more embodiments of the invention. The aggregate payment medium is configured to complete the user's transaction in an optimal manner, attempting to maximize benefits while minimizing costs associated with the transaction by selecting, separately for each transaction to be performed, the most suitable payment medium on behalf of the user. Embodiments of the invention may be used for in-store purchases where payment terminals are available. Embodiments of the invention may also be used in online transaction where payment information of a checkout page may be automatically entered for the user. Embodiments of the invention may further be used for any type of transaction by providing, to the user, a recommendation regarding the payment medium to be used for a particular transaction.

Embodiments of the invention further accommodate user preferences such as preferences for a particular reward. One or more embodiments of the invention further consider and learn past user behavior in order to make optimal suggestions. For example, the payment medium to be used may be chosen based on the probability that the user will pay back the resulting balance, in order to minimize costs resulting from maintaining a balance. In addition, if a balance remains on one or more of the payment media, recommendations for minimizing the cost associated with this balance may be made. For example, the system may research alternative payment media that would allow maintaining the balance at a lower cost, e.g., due to a lower interest rate and may then recommend or perform a balance transfer.

Figure 8A:
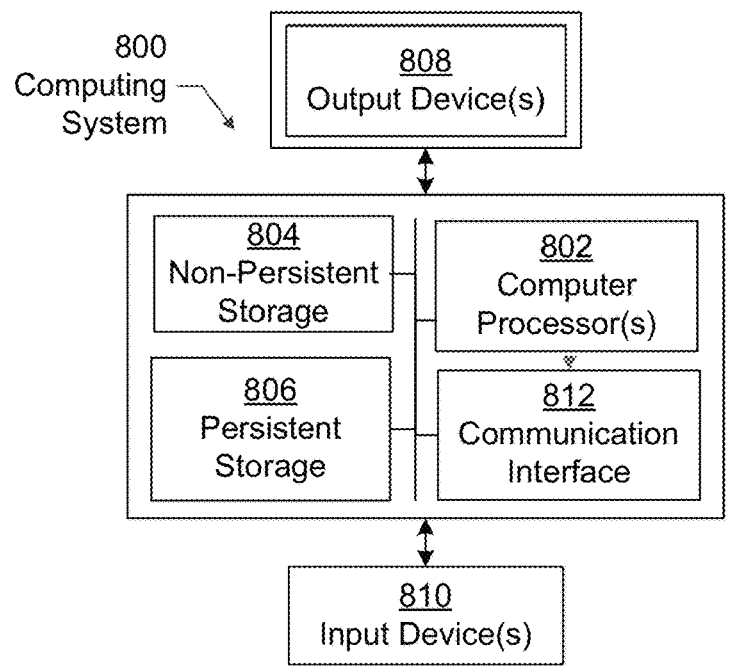
FIGS. 8A and 8B show a computing system in accordance with one or more embodiments of the invention.

Embodiments of the invention may be implemented on a computing system. Any combination of mobile, desktop, server, router, switch, embedded device, or other types of hardware may be used. For example, as shown in FIG. 8A, the computing system (800) may include one or more computer processors (802), non-persistent storage (804) (e.g., volatile memory, such as random access memory (RAM), cache memory), persistent storage (806) (e.g., a hard disk, an optical drive such as a compact disk (CD) drive or digital versatile disk (DVD) drive, a flash memory, etc.), a communication interface (812) (e.g., Bluetooth interface, infrared interface, network interface, optical interface, etc.), and numerous other elements and functionalities.

The computer processor(s) (802) may be an integrated circuit for processing instructions. For example, the computer processor(s) may be one or more cores or micro-cores of a processor. The computing system (800) may also include one or more input devices (810), such as a touchscreen, keyboard, mouse, microphone, touchpad, electronic pen, or any other type of input device.

The communication interface (812) may include an integrated circuit for connecting the computing system (800) to a network (not shown) (e.g., a local area network (LAN), a wide area network (WAN) such as the Internet, mobile network, or any other type of network) and/or to another device, such as another computing device.

Further, the computing system (800) may include one or more output devices (808), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (802), non-persistent storage (804), and persistent storage (806). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention.

Figure 8B:
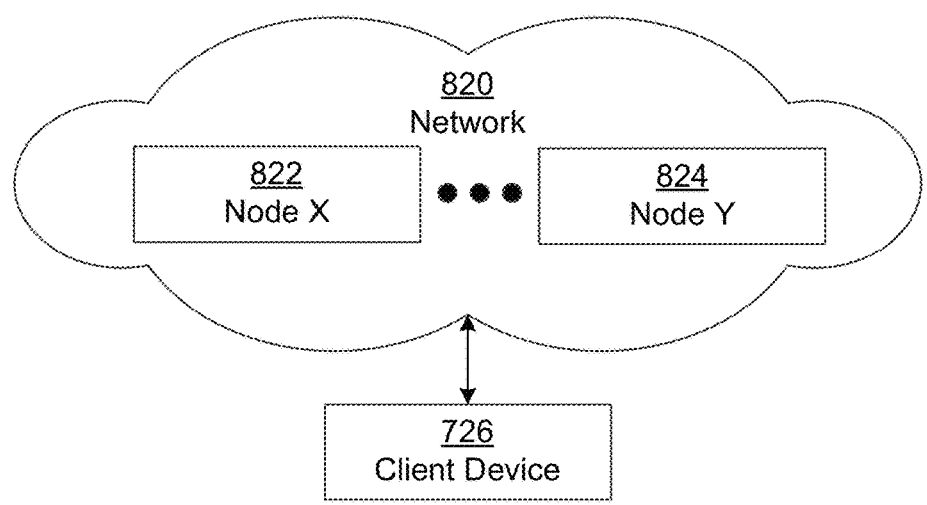

The computing system (800) in FIG. 8A may be connected to or be a part of a network. For example, as shown in FIG. 8B, the network (820) may include multiple nodes (e.g., node X (822), node Y (824)). Each node may correspond to a computing system, such as the computing system shown in FIG. 8A, or a group of nodes combined may correspond to the computing system shown in FIG. 8A. By way of an example, embodiments of the invention may be implemented on a node of a distributed system that is connected to other nodes. By way of another example, embodiments of the invention may be implemented on a distributed computing system having multiple nodes, where each portion of the invention may be located on a different node within the distributed computing system. Further, one or more elements of the aforementioned computing system (800) may be located at a remote location and connected to the other elements over a network.

Although not shown in FIG. 8B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (822), node Y (824)) in the network (820) may be configured to provide services for a client device (826). For example, the nodes may be part of a cloud computing system. The nodes may include functionality to receive requests from the client device (826) and transmit responses to the client device (826). The client device (826) may be a computing system, such as the computing system shown in FIG. 8A. Further, the client device (826) may include and/or perform all or a portion of one or more embodiments of the invention.

The computing system or group of computing systems described in FIGS. 8A and 8B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data described in the present application, between processes without departing from the scope of the invention. The processes may be part of the same or different application and may execute on the same or different computing system.

Rather than or in addition to sharing data between processes, the computing system performing one or more embodiments of the invention may include functionality to receive data from a user. For example, in one or more embodiments, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using techniques described above or from storage, the computing system, in performing one or more embodiments of the invention, may extract one or more data items from the obtained data. For example, the extraction may be performed as follows by the computing system in FIG. 8A. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (consisting of layers of nodes at different levels of detail-such as in nested packet headers or nested document sections). Then, the raw, unprocessed stream of data symbols is parsed, in the context of the organizing pattern, into a stream (or layered structure) of tokens (where each token may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query provided to a structured data repository (where the data repository may be organized according to a database schema or data format, such as XML).

The extracted data may be used for further processing by the computing system. For example, the computing system of FIG. 8A, while performing one or more embodiments of the invention, may perform data comparison. Data comparison may be used to compare two or more data values (e.g., A, B). For example, one or more embodiments may determine whether A>B, A=B, A !=B, A<B, etc. The comparison may be performed by submitting A, B, and an opcode specifying an operation related to the comparison into an arithmetic logic unit (ALU) (i.e., circuitry that performs arithmetic and/or bitwise logical operations on the two data values). The ALU outputs the numerical result of the operation and/or one or more status flags related to the numerical result. For example, the status flags may indicate whether the numerical result is a positive number, a negative number, zero, etc. By selecting the proper opcode and then reading the numerical results and/or status flags, the comparison may be executed. For example, in order to determine if A>B, B may be subtracted from A (i.e., A−B), and the status flags may be read to determine if the result is positive (i.e., if A>B, then A−B>0). In one or more embodiments, B may be considered a threshold, and A is deemed to satisfy the threshold if A=B or if A>B, as determined using the ALU. In one or more embodiments of the invention, A and B may be vectors, and comparing A with B requires comparing the first element of vector A with the first element of vector B, the second element of vector A with the second element of vector B, etc. In one or more embodiments, if A and B are strings, the binary values of the strings may be compared.

The computing system in FIG. 8A may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system of FIG. 8A may include functionality to provide raw and/or processed data, such as results of comparisons and other processing. For example, providing data may be accomplished through various presenting methods. Specifically, data may be provided through a user interface provided by a computing device. The user interface may include a GUI that displays information on a display device, such as a computer monitor or a touchscreen on a handheld computer device. The GUI may include various GUI widgets that organize what data is shown as well as how data is provided to a user. Furthermore, the GUI may provide data directly to the user, e.g., data provided as actual data values through text, or rendered by the computing device into a visual representation of the data, such as through visualizing a data model.

For example, a GUI may first obtain a notification from a software application requesting that a particular data object be provided within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be provided through various audio methods. In particular, data may be rendered into an audio format and provided as sound through one or more speakers operably connected to a computing device.

Data may also be provided to a user through haptic methods. For example, haptic methods may include vibrations or other physical signals generated by the computing system. For example, data may be provided to a user using a vibration generated by a handheld computer device with a predefined duration and intensity of the vibration to communicate the data.

The above description of functions presents only a few examples of functions performed by the computing system of FIG. 8A and the nodes and/or client device in FIG. 8B. Other functions may be performed using one or more embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for performing transactions between a payee and a payer using a non-transitory aggregate payment medium associated with the payer, the method comprising:
    obtaining, for the transaction and by the non-transitory aggregate payment medium, payee data characterizing the payee, wherein the non-transitory aggregate payment medium comprises a plurality of payment media from which to select one payment medium for a transaction in a transaction-specific manner, based on rules governing a use of the payment medium for a payment associated with the transaction;
    obtaining transaction data associated with the transaction to be performed between the payer and the payee, using the non-transitory aggregate payment medium;
    obtaining the rules associated with the plurality of payment media that are associated with the non-transitory aggregate payment medium;
    determining, for each payment medium of the plurality of payment media, a benefit associated with using the payment medium for the transaction, based on the rules associated with the payment medium and the payee data;
    determining, for each payment medium of the plurality of payment media, a cost owed by the payer and associated with using the payment medium for the transaction, based on the rules associated with the payment medium and the payee data;
    obtaining, for each of the plurality of payment media, a return from using the payment medium for the transaction, based on the benefit and the cost;
    selecting, from the plurality of payment media, a payment medium with a highest return; and
    providing, by the non-transitory aggregate payment medium, payment medium data associated with the selected payment medium to the payee to enable execution of the transaction.

2. The method of claim 1, wherein determining the benefit associated with using the payment medium for the transaction comprises:
    obtaining a reward rate associated with using the payment medium; and
    multiplying a transaction amount of the transaction with the reward rate to obtain the benefit.

3. The method of claim 2, wherein determining the benefit associated with using the payment medium for the transaction further comprises:
    converting a bonus reward into the reward rate.

4. The method of claim 2, wherein determining the benefit associated with using the payment medium for the transaction further comprises:
    converting a non-monetary reward into a momentary reward to obtain the reward rate.

5. The method of claim 2, wherein determining the benefit associated with using the payment medium for the transaction further comprises:
    applying a weighting to the benefit, wherein the weighting adjusts the benefit for user preference.

6. The method of claim 1, wherein determining the cost associated with using the payment medium for the transaction comprises:
estimating interest payments resulting from the transaction.

7. The method of claim 6, wherein estimating interest payments comprises:
obtaining an interest rate associated with the payment medium;
estimating a balance to which the interest rate is to be applied.

8. The method of claim 7, wherein the balance is estimated based on a balance of an affiliated bank account relative to a balance of the non-transitory aggregate payment medium.

9. The method of claim 7, wherein the balance is estimated using statistical models.

10. The method of claim 1, wherein determining the cost associated with using the payment medium for the transaction comprises:
based on determination that the transaction triggers foreign transaction fees, determining the foreign transaction fees.

11. The method of claim 1, further comprising:
determining a first cost of a debt associated with a first payment medium of the plurality of payment media;
determining a second cost of the debt transferred to a second payment medium; and
determining that the second cost is sufficiently lower than the first cost to initiate a balance transfer of the debt from the first payment medium to the second payment medium.

12. The method of claim 1, further comprising providing non-transitory aggregate payment medium financial information to the payer by aggregating payment medium financial information obtained for the plurality of payment media.

13. The method of claim 12, wherein the non-transitory aggregate payment medium financial information comprises at least one selected from a group consisting of an accumulated rewards summary, an effective interest rate, and a financial event history.

14. A non-transitory computer-readable storage medium storing a program, which when executed on a processor, performs instructions comprising:
obtaining, for the transaction and by the aggregate payment medium associated with a payer, payee data characterizing a payee, wherein the aggregate payment medium comprises a plurality of payment media from which to select one payment medium for a transaction in a transaction-specific manner, based on rules governing a use of the payment medium in a payment associated with the transaction;
obtaining, transaction data associated with the transaction to be performed between the payer and the payee, using the aggregate payment medium;
obtaining the rules associated with the plurality of payment media that are associated with the aggregate payment medium;
determining, for each payment medium of the plurality of payment media, a benefit associated with using the payment medium for the transaction, based on the rules associated with the payment medium and the payee data;
determining, for each payment medium of the plurality of payment media, a cost owed by the payer and associated with using the payment medium for the transaction, based on the rules associated with the payment medium and the payee data;
obtaining, for each of the plurality of payment media, a return from using the payment medium for the transaction, based on the benefit and the cost;
selecting, from the plurality of payment media, a payment medium with a highest return; and
providing, by the aggregate payment medium, payment medium data associated with the selected payment medium to the payee to enable execution of the transaction.

15. The non-transitory computer-readable storage medium of claim 14, wherein determining the benefit associated with using the payment medium for the transaction comprises:
obtaining a reward rate associated with using the payment medium; and
multiplying a transaction amount of the transaction with the reward rate to obtain the benefit.

16. The non-transitory computer-readable storage medium of claim 14, wherein determining the cost associated with using the payment medium for the transaction comprises:
estimating interest payments resulting from the transaction.

17. The non-transitory computer-readable storage medium of claim 14, wherein determining the cost associated with using the payment medium for the transaction comprises:
based on determination that the transaction triggers foreign transaction fees, determining the foreign transaction fees.

18. The non-transitory computer-readable storage medium of claim 14, wherein the instructions further comprise:
determining a first cost of a debt associated with a first payment medium of the plurality of payment media;
determining a second cost of the debt transferred to a second payment medium; and
determining that the second cost is sufficiently lower than the first cost to initiate a balance transfer of the debt from the first payment medium to the second payment medium.

19. The non-transitory computer-readable storage medium of claim 14, wherein the instructions further comprise providing aggregate payment medium financial information to the payer by aggregating payment medium financial information obtained for the plurality of payment media.

20. The non-transitory computer-readable storage medium of claim 19, wherein the aggregate payment medium financial information comprises at least one selected from a group consisting of an accumulated rewards summary, an effective interest rate, and a financial event history.

21. A non-transitory aggregate payment medium associated with a payer, the non-transitory aggregate payment medium comprising:
a plurality of payment media from which to select one payment medium for a transaction in a transaction-specific manner, based on rules governing a use of the payment medium in a payment associated with the transaction;
a payment terminal interface configured to interface with a payment terminal; and
a system on a chip communicatively connected to the payment terminal interface and configured to:

obtain, for the transaction, payee data characterizing the payee;
obtain, by the non-transitory aggregate payment medium, and via the payment terminal interface, transaction data associated with the transaction to be performed between the payer and the payee, using the non-transitory aggregate payment medium;
obtain the rules associated with the plurality of payment media that are associated with the non-transitory aggregate payment medium;
determine, for each payment medium of the plurality of payment media, a benefit associated with using the payment medium for the transaction, based on the rules associated with the payment medium, and the payee data;
determine, for each payment medium of the plurality of payment media, a cost owed by the payer and associated with using the payment medium for the transaction, based on the rules associated with the payment medium, and the payee data;
obtain, for each of the plurality of payment media, a return from using the payment medium for the transaction, based on the benefit and the cost;
select, from the plurality of payment media, a payment medium with a highest return; and
provide, by the non-transitory aggregate payment medium, payment medium data associated with the selected payment medium to the payee using the payment terminal interface to enable execution of the transaction.

22. The non-transitory aggregate payment medium of claim 21, wherein the payment terminal interface comprises at least one selected from a group consisting of a dynamic magnetic strip and an EMV chip.

23. The non-transitory aggregate payment medium of claim 21, wherein the payee data is obtained from the payment terminal using the payment terminal interface.

24. The non-transitory aggregate payment medium of claim 21 further comprising a Bluetooth communication interface configured to communicatively connect the system on a chip to a portable user device.

25. The non-transitory aggregate payment medium of claim 24, wherein the payee data is obtained by a merchant identification engine executing on the portable user device.

26. The non-transitory aggregate payment medium of claim 21, wherein the system on a chip and the payment terminal interface are comprised in a housing with dimensions of a credit card.

27. The non-transitory aggregate payment medium of claim 21, wherein the housing further comprises a battery configured to power the system on a chip and the payment terminal interface.

* * * * *